(12) United States Patent
Endou et al.

(10) Patent No.: US 10,184,082 B2
(45) Date of Patent: Jan. 22, 2019

(54) BIOMASS PYROLYSIS APPARATUS, AND POWER GENERATION SYSTEM

(71) Applicant: MITSUBISHI HEAVY INDUSTRIES ENVIRONMENTAL & CHEMICAL ENGINEERING CO., LTD., Yokohama-shi, Kanagawa (JP)

(72) Inventors: Yuuki Endou, Yokohama (JP); Hirotami Yamamoto, Yokohama (JP); Keiichi Ishikawa, Yokohama (JP)

(73) Assignee: MITSUBISHI HEAVY INDUSTRIES ENVIRONMENTAL & CHEMICAL ENGINEERING CO., LTD., Kanagawa (JP)

( * ) Notice: Subject to any disclaimer, the term of this patent is extended or adjusted under 35 U.S.C. 154(b) by 485 days.

(21) Appl. No.: 14/771,806

(22) PCT Filed: Mar. 26, 2014

(86) PCT No.: PCT/JP2014/058546
§ 371 (c)(1),
(2) Date: Sep. 1, 2015

(87) PCT Pub. No.: WO2014/168004
PCT Pub. Date: Oct. 16, 2014

(65) Prior Publication Data
US 2016/0024389 A1     Jan. 28, 2016

(30) Foreign Application Priority Data

Apr. 10, 2013   (JP) ................................ 2013-082232

(51) Int. Cl.
*C10B 53/02* (2006.01)
*C10L 5/44* (2006.01)
(Continued)

(52) U.S. Cl.
CPC .............. *C10B 53/02* (2013.01); *C10B 37/00* (2013.01); *C10B 41/00* (2013.01); *C10B 47/28* (2013.01);
(Continued)

(58) Field of Classification Search
CPC . F23G 5/027; F23N 5/022; B09B 3/00; B09B 5/00; C10B 53/00
See application file for complete search history.

(56) References Cited

U.S. PATENT DOCUMENTS 4,340,391 A * 7/1982 Demaison .............. G01V 9/007
422/80
5,053,604 A * 10/1991 Escaravage ............. C03B 29/06
219/483

(Continued)

FOREIGN PATENT DOCUMENTS

CN     1118422 A    3/1996
CN     2720279 Y    8/2005
(Continued)

OTHER PUBLICATIONS

JP 2006162198 A English.*
(Continued)

*Primary Examiner* — Mark Laurenzi
*Assistant Examiner* — Shafiq Mian
(74) *Attorney, Agent, or Firm* — Kanesaka Berner and Partners LLP

(57) ABSTRACT

Provided is a biomass pyrolysis apparatus comprising: a combustion furnace that produces a heat quantity by causing a stable property fuel to combust; a pyrolysis gasification furnace that produces a torrefied material, and a pyrolysis gas by pyrolyzing woody biomass by a heat quantity produced by the combustion furnace; and a pyrolysis gas introduction passage that introduces the pyrolysis gas from (Continued)

the pyrolysis gasification furnace into a boiler, into which the torrefied material is introduced.

3 Claims, 2 Drawing Sheets

(51) Int. Cl.
  C10L 9/08  (2006.01)
  F01K 13/00  (2006.01)
  F23G 5/00  (2006.01)
  F23G 5/027  (2006.01)
  F23G 5/20  (2006.01)
  F23G 5/46  (2006.01)
  C10B 37/00  (2006.01)
  C10B 41/00  (2006.01)
  C10B 47/28  (2006.01)
  F01K 11/02  (2006.01)
  C10B 47/30  (2006.01)

(52) U.S. Cl.
  CPC ............... *C10L 5/442* (2013.01); *C10L 9/083* (2013.01); *F01K 11/02* (2013.01); *F01K 13/00* (2013.01); *F23G 5/006* (2013.01); *F23G 5/0273* (2013.01); *F23G 5/20* (2013.01); *F23G 5/46* (2013.01); *C10B 47/30* (2013.01); *C10L 2200/0469* (2013.01); *C10L 2290/02* (2013.01); *C10L 2290/06* (2013.01); *C10L 2290/58* (2013.01); *F23G 2201/303* (2013.01); *F23G 2201/304* (2013.01); *F23G 2206/203* (2013.01); *F23G 2209/26* (2013.01); *Y02E 20/12* (2013.01); *Y02E 50/10* (2013.01); *Y02E 50/14* (2013.01); *Y02E 50/15* (2013.01); *Y02E 50/30* (2013.01)

(56) References Cited

U.S. PATENT DOCUMENTS

| | | | |
|---|---|---|---|
| 5,653,180 A | 8/1997 | Kaneko | |
| 8,963,347 B2 * | 2/2015 | Baxter | F01K 13/00 290/1 R |
| 9,321,684 B2 * | 4/2016 | Hue | C04B 7/24 110/248 |
| 9,598,653 B2 * | 3/2017 | Bland | C10L 5/366 |
| 2007/0234937 A1 * | 10/2007 | Guyomarc'h | F23G 5/0276 110/248 |
| 2009/0308295 A1 * | 12/2009 | Thiessen | F01K 23/067 110/229 |
| 2011/0061385 A1 * | 3/2011 | Baxter | F01K 13/00 60/649 |
| 2012/0056431 A1 * | 3/2012 | Bland | C10L 5/366 290/52 |
| 2012/0110902 A1 * | 5/2012 | Yi | B01D 53/52 44/624 |
| 2014/0202364 A1 * | 7/2014 | Nakayama | F23G 5/0276 110/346 |

FOREIGN PATENT DOCUMENTS

| | | |
|---|---|---|
| EP | 1277825 A1 | 1/2003 |
| JP | 8-49822 A | 2/1996 |
| JP | 10-244176 A | 9/1998 |
| JP | 2002-11451 A | 1/2002 |
| JP | 2006-162198 A | 6/2006 |
| JP | 4276973 B2 | 6/2009 |
| JP | 4472380 B2 | 6/2010 |
| JP | 2012-177485 A | 9/2012 |
| JP | 2012-219176 A | 11/2012 |
| JP | 2013-87988 A | 5/2013 |
| WO | 2010/121574 A2 | 10/2010 |

OTHER PUBLICATIONS

Office Action in CN Application No. 201480011536.1, dated Jun. 2, 2016.
Search Report in EP Application No. 14782821.4, dated Feb. 18, 2016.
International Search Report in International Patent Application No. PCT/JP2014/058546, dated May 20, 2014.
Written Opinion in International Patent Application No. PCT/JP2014/058546, dated May 20, 2014.

* cited by examiner

US 10,184,082 B2

BIOMASS PYROLYSIS APPARATUS, AND POWER GENERATION SYSTEM

RELATED APPLICATIONS

The present application is a National Phase of International Application No. PCT/JP2014/058546, filed Mar. 26, 2014, which claims priority to Japanese Application Nos. 2013-082232, filed Apr. 10, 2013.

TECHNICAL FIELD

The present invention relates to a biomass pyrolysis apparatus that produces a torrefied material and a pyrolysis gas by pyrolyzing woody biomass, and a power generation system provided therewith.

BACKGROUND ART

The gasification of biomass, such as woody biomass, in a pyrolysis gasification system and conversion of the biomass, which has been conventionally treated as waste, into resources for effective use has been in demand. Biomass, compared to fossil fuels and the like, is low in energy density. One known method for increasing the energy density of biomass is a torrefied method in which most of a heat quantity in a woody biomass is caused to remain, and a fiber portion (cellulose and lignin) contained in the woody biomass is thermally decomposed (refer to Patent Document 1, for example).

The semi-carbonization method is a technique in which a torrefied material (torrefied fuel) is produced by pyrolyzing woody biomass at 250° C. to 350° C. in the absence of oxygen. With the decomposition of the fiber portion, the torrefied material becomes easy to pulverize, making it possible to pulverize the material using a pulverizer (mill) and then use the material as fuel for a pulverized coal boiler.

Herein, a conventional coal-fired thermal power generation system will be described with reference to FIG. 2. A coal-fired thermal power generation system 101 utilizes a torrefied material T manufactured by pyrolyzing a woody biomass B in a pyrolysis gasification furnace 4 as fuel in a coal-fired power plant 7.

Specifically, the torrefied material T is pulverized by a pulverizer 15 along with a coal C supplied from a coal bunker 14, and introduced as a pulverized coal PC into a pulverized coal boiler 16. Then, steam produced by the heat produced when the pulverized coal PC was caused to combust in the pulverized coal boiler 16 is introduced into a steam turbine 17, and power is generated in a power generator 18 directly connected to the steam turbine 17.

In this coal-fired thermal power generation system 101, a pyrolysis gas P produced in the pyrolysis gasification furnace 4 and separated in a cyclone 6 is caused to combust in a combustion furnace 3. A combustion exhaust gas E produced by this combustion is utilized as a heat source for the pyrolysis gasification furnace 4 itself, thereby decreasing the use of an auxiliary fuel F, the auxiliary fuel F being the fuel of the combustion furnace 3. Moreover, the cyclone 6 can also be omitted.

CITATION LIST

Patent Literature

Patent Document 1: Japanese Unexamined Patent Application Publication No. 2012-219176A

SUMMARY OF INVENTION

Technical Problem

Nevertheless, the semi-carbonization method used in the conventional coal-fired thermal power generation system 101 described above has problems such as described below.

The first problem is that the heat quantity that remains in the torrefied material is limited to 60% to 80%, given 100% as a heat input of the woody biomass. The remaining heat input of the woody biomass is self-consumed as a heating heat source for pyrolysis gasification as pyrolysis gas.

The second problem is that increasing the grindability grindability of the torrefied material decreases the amount of power generation derived from the biomass. Even if, for example, a pyrolysis gasification temperature is constantly controlled at 300° C., the properties (grindability in the pulverizer) of the produced torrefied material greatly fluctuate due to fluctuations in raw material properties and fluctuations in the raw material moisture content. For example, the thermal load required for pyrolysis rises by a rise in the raw material moisture content.

As a result, even if the pyrolysis gasification temperature is maintained at 300° C., the torrefied material temperature rise is suppressed, thereby decreasing the finishing temperature of the torrefied material and making it impossible to thermally decompose the fiber portion in the woody biomass. With the fiber portion remaining, the problem then faced is a decrease in the grindability of the pulverizer.

If the grindability of the torrefied material decreases, the amount of torrefied material supplied to the pulverizer needs to be suppressed to avoid power overload (deviation from permissible values) of the pulverizer, and a stable mixed fuel burning ratio of the torrefied material is not achieved. Thus, to provide a stable supply of the torrefied material, storage equipment such as a buffer tank for the torrefied material is required, resulting in an increase in equipment costs.

As means for solving this problem, the pyrolysis gasification temperature may be increased, thereby improving the grindability of the torrefied material. However, this method promotes the gasification of woody biomass, resulting in a decrease in the heat quantity that remains (the residual ratio of heat quantity) in the torrefied material. That is, its value as an alternative fuel to coal-fired thermal power decreases, making it difficult for a power producer to reap the benefits of introducing torrefaction equipment.

Therefore, an object of the present invention is to provide a biomass pyrolysis apparatus capable of effectively utilizing the heat quantity held by woody biomass, and a power generation system.

Solution to Problem

According to a first aspect of the present invention, a biomass pyrolysis apparatus includes a combustion furnace that produces a heat quantity by causing a stable property fuel to combust; a pyrolysis gasification furnace that produces a torrefied material and a pyrolysis gas by pyrolyzing a woody biomass by a heat quantity produced by the combustion furnace; and a pyrolysis gas introduction passage that introduces the pyrolysis gas from the pyrolysis gasification furnace into a boiler, into which the torrefied material is introduced.

According to the above configuration, the pyrolysis gas is introduced into the boiler along with the torrefied material produced in the pyrolysis gasification furnace, thereby making it possible to utilize substantially all of the heat quantity of the woody biomass supplied to the pyrolysis gasification furnace in the boiler regardless of the residual ratio of heat quantity in the torrefied material.

Furthermore, with use of the stable property fuel as the fuel for the combustion furnace, it is possible to steadily maintain the heat quantity for pyrolyzing the woody biomass in the pyrolysis gasification furnace. That is, the torrefied material can be produced in the pyrolysis gasification furnace in a stable manner.

In the biomass pyrolysis apparatus described above, the pyrolysis gasification furnace may be an indirect heating type of pyrolysis gasification furnace that indirectly heats the woody biomass by a heating gas.

According to the above configuration, the pyrolysis gas produced in the pyrolysis gasification furnace is not diluted with the heating gas, and a gas with a high amount of heat generation is obtained. Furthermore, the amount of gas produced is also suppressed, making it possible to supply pyrolysis gas suitable for use as a fuel.

The biomass pyrolysis apparatus described above includes a control device that controls a temperature of the pyrolysis gasification furnace, and the control device may control the temperature of the pyrolysis gasification furnace so that the current value of the pulverizer that pulverizes the torrefied material produced by the pyrolysis gasification furnace is generally in a constant range.

According to the above configuration, the pyrolysis gasification temperature is adjusted on the basis of a required power of the pulverizer, making it possible to produce a torrefied material superior in grindability. While the residual ratio of heat quantity of the torrefied material decreases with the manufacture of the torrefied material superior in grindability, the increased pyrolysis gas is supplied to the boiler, making it possible to make the amount of power generation derived from woody biomass substantially constant.

Furthermore, since the torrefied material superior in grindability can be manufactured, equipment such as a buffer tank that stores torrefied material when the pulverizer load becomes excessive is no longer required.

According to a second aspect of the present invention, a power generation system includes any one of the above described biomass pyrolysis apparatuses, a boiler into which the torrefied material is introduced and by which the torrefied material is combusted, a steam turbine into which steam produced by the boiler is introduced, and a power generator driven by the steam turbine.

According to the above configuration, it is possible to construct a system capable of utilizing substantially all of the heat quantity of the woody biomass supplied to the pyrolysis gasification furnace as energy for power generation.

Advantageous Effects of Invention

According to the present invention, substantially all of the heat quantity of the woody biomass supplied to the pyrolysis gasification furnace can be utilized in the boiler regardless of the residual ratio of heat quantity in the torrefied material. That is, the heat quantity held by woody biomass can be effectively utilized.

DESCRIPTION OF EMBODIMENTS

The following describes in detail an embodiment of the present invention, with reference to the drawings.

Figure 1:
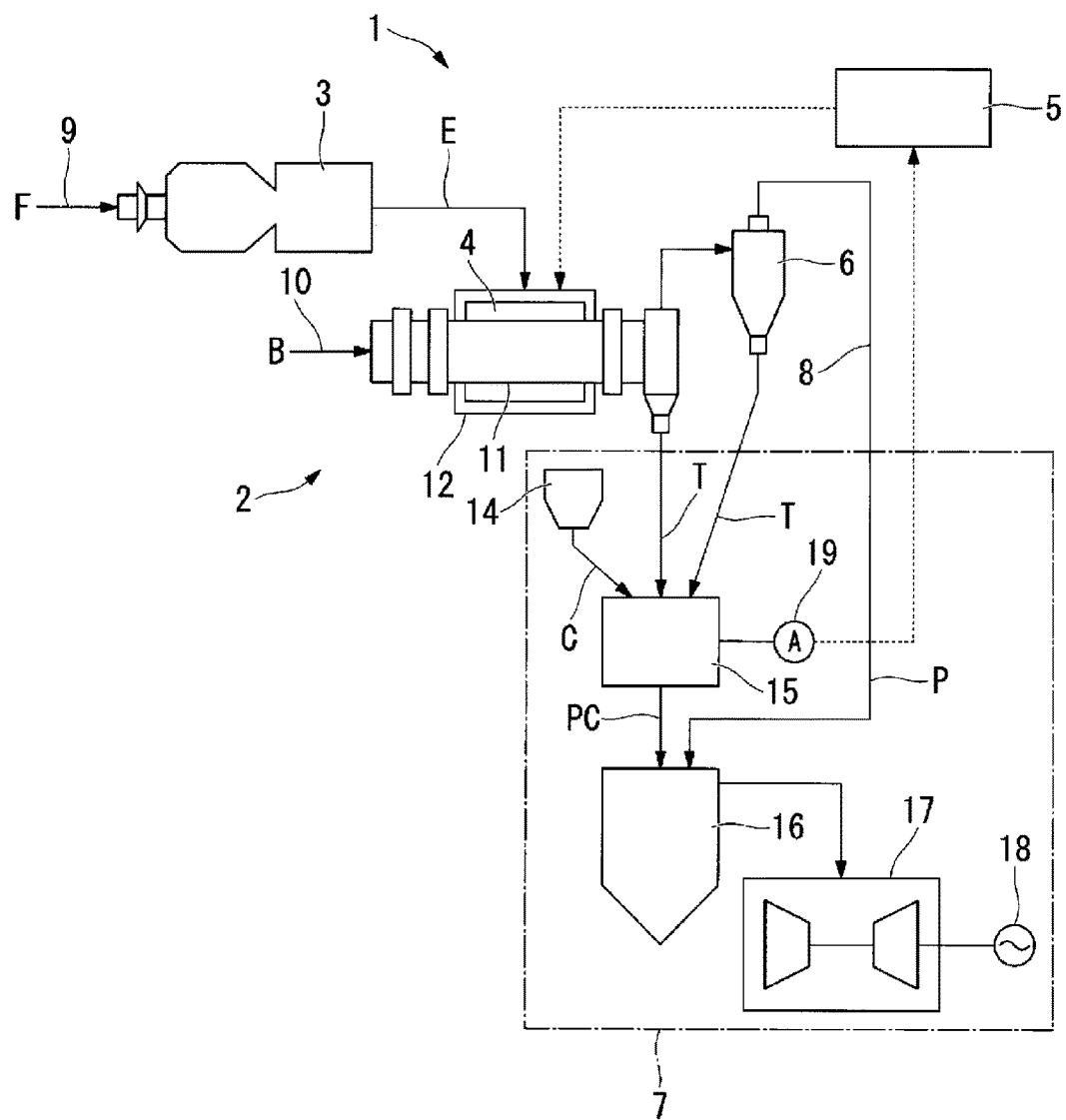
FIG. 1 is a system diagram of a coal-fired thermal power generation system of an embodiment of the present invention.
Figure 2:
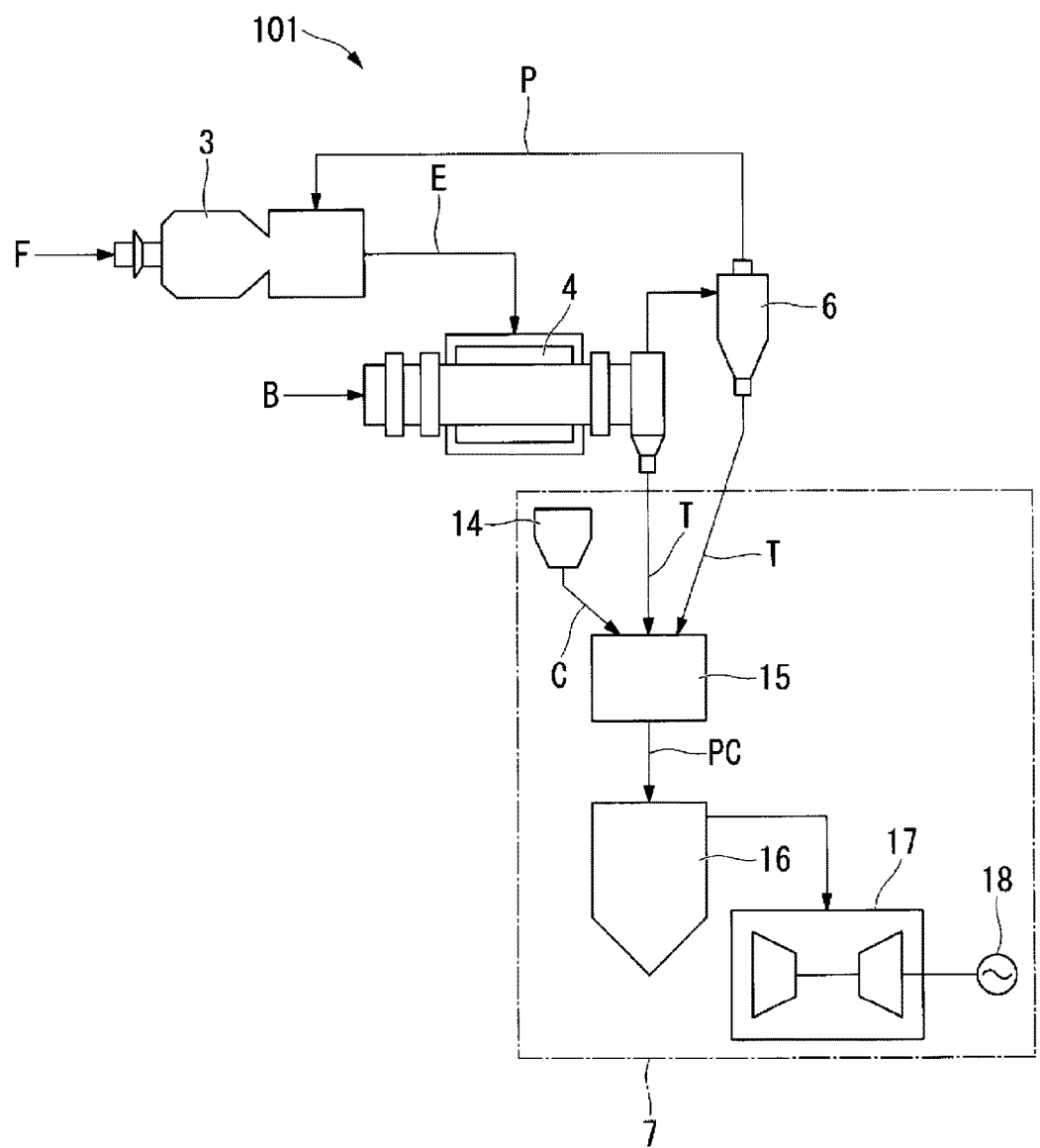
FIG. 2 is a system diagram of a conventional coal-fired thermal power generation system.

As shown in FIG. 1, a coal-fired thermal power generation system 1 of this embodiment includes the combustion furnace 3 that produces the combustion exhaust gas E by causing the stable property fuel F serving as an auxiliary fuel to combust, the pyrolysis gasification furnace 4 (carbonization furnace) that pyrolyzes the woody biomass B, a control device 5 that controls a temperature of the pyrolysis gasification furnace 4, the cyclone 6 that separates and removes the torrefied material T from within the pyrolysis gas P produced in the pyrolysis gasification furnace 4, and a coal-fired power plant 7 that generates power utilizing the torrefied material T and the pyrolysis gas P obtained in the pyrolysis gasification furnace 4.

It should be noted that the cyclone 6 may be omitted.

The stable property fuel F serving as a fuel in which the properties of coal and the like have been stabilized is supplied as an auxiliary fuel to the combustion furnace 3 via an auxiliary fuel line 9. Fuels that can be adopted as the stable property fuel F are fossil fuels such as coal, shale gas, petroleum, and heavy oil, and fuels with stable properties such as blast furnace gas produced in a blast furnace. In other words, adoption of a fuel in which the amount of heat generation fluctuates according to changes in moisture content, for example, as the fuel to be introduced into the combustion furnace 3 is not preferred.

The pyrolysis gasification furnace 4 is an indirect heating type of pyrolysis gasification furnace that indirectly heats the woody biomass B, causing pyrolysis and a gasification reaction. The pyrolysis gasification furnace 4 utilizes the combustion exhaust gas E supplied from the combustion furnace 3 as a heating gas. Specifically, the pyrolysis gasification furnace 4 is an externally heated rotary kiln type and includes an inner tube 11 into which the woody biomass B supplied from a biomass supply line 10 is fed, and an outer tube 12 disposed on an outer peripheral side of this inner tube 11, concentric with the inner tube 11. The inner tube 11 and the outer tube 12 integrally rotate, agitating the contents. The combustion exhaust gas E supplied from the combustion furnace 3 is fed into the outer tube 12.

It should be noted that while an externally heated rotary kiln type is used as the pyrolysis gasification furnace 4 herein, the type is not limited thereto as long as it is a format that indirectly heats the woody biomass B. For example, an externally heated screw conveyor or the like may be used as the pyrolysis gasification furnace 4.

The woody biomass B is a biomass (biological resource) made of wood and, for example, is woody chips and palm kernel shells (PKS).

The coal-fired power plant 7, a steam power generation type power plant, includes the coal bunker 14 that stores coal and includes a discharge port that discharges coal, the pulverizer 15 (a mill or coal pulverizer) that pulverizes the coal C supplied from the coal bunker 14 and the torrefied material T supplied from the pyrolysis gasification furnace 4 and the cyclone 6, the pulverized coal boiler 16 that causes the pulverized coal PC produced in the pulverizer 15 to combust, the steam turbine 17 into which steam produced by the heat produced when the pulverized coal PC was caused to combust in the pulverized coal boiler 16 is introduced, and the power generator 18 driven by the steam turbine 17.

The pulverizer 15 is a vertical-type roller mill that finely pulverizes the coal C and the torrefied material T while drying them. An ammeter 19 capable of continuously measuring the current value of the pulverizer 15 is provided on the pulverizer 15. Specifically, the ammeter 19 is configured so as to measure the current value of a motor (electric motor) that rotates a roller provided on the pulverizer 15.

The motor of the pulverizer 15 is controlled by rotational speed control in accordance with the load. That is, the current value fluctuates when the load applied to the motor fluctuates. For example, the current value increases when the grindability of the material to be pulverized deteriorates, and decreases when the grindability of the material improves.

It should be noted that the equipment adopted as the pulverizer 15 is not limited to the vertical-type roller mill described above, allowing suitable adoption of equipment of a format that crushes, such as a tube mill, ball mill, and roller mill, for example.

The pulverized coal boiler 16 is a pulverized coal combustion system that jets out the pulverized coal PC along with air by a burner, causing combustion. Furthermore, a pyrolysis gas introduction passage 8 that introduces the pyrolysis gas P produced in the pyrolysis gasification furnace 4 is connected to the pulverized coal boiler 16. The pyrolysis gasification furnace 4 and the coal-fired power plant 7 are adjacently disposed so as to shorten the pyrolysis gas introduction passage 8 to the extent possible.

The power generator 18 is a turbine generator that is directly connected to and driven by the steam turbine 17.

The control device 5 is a computer that mainly controls a temperature of the pyrolysis gasification furnace 4. Specifically, the control device 5 controls the temperature of the pyrolysis gasification furnace 4 so that the torrefied material T with favorable grindability is manufactured in the pulverizer 15 of the coal-fired power plant 7. Furthermore, the control device 5 has a function that controls the temperature of the pyrolysis gasification furnace 4 so that the current value of the pulverizer 15 measured by the ammeter 19 is in a generally constant range.

Next, the operation of the coal-fired thermal power generation system 1 of this embodiment will be described.

The combustion furnace 3 causes the stable property fuel F supplied via the auxiliary fuel line 9 to combust, producing the combustion exhaust gas E. This combustion exhaust gas E is fed to the outer tube 12 of the pyrolysis gasification furnace 4.

The woody biomass B is supplied from a stockyard of the woody biomass B (not illustrated) to the inner tube 11 of the pyrolysis gasification furnace 4 via the biomass supply line 10, and heated by the combustion exhaust gas E inside the outer tube 12 while agitated in an oxygen-deficient environment inside the inner tube 11 that rotates.

The temperature inside the inner tube 11 of the pyrolysis gasification furnace 4 is controlled by the control device 5. The temperature inside the inner tube 11 of the pyrolysis gasification furnace 4 is controlled so that the woody biomass B is pyrolyzed at 250° C. to 350° C. in the absence of oxygen.

The relationship among the heating temperature of the woody biomass B in the pyrolysis gasification furnace 4, the residual ratio of heat quantity of the woody biomass B, and the grindability of the manufactured torrefied material T will now be described. The residual ratio of heat quantity of the woody biomass B decreases with a rise in the heating temperature of the woody biomass B. Meanwhile, the grindability of the manufactured torrefied material T improves with a rise in the heating temperature of the woody biomass B. That is, the residual ratio of heat quantity of the woody biomass B and the grindability of the manufactured torrefied material T are in a trade-off relationship.

The heating temperature, that is, the temperature inside the inner tube 11 of the pyrolysis gasification furnace 4, is controlled at a well-balanced temperature where the residual ratio of heat quantity that decreases with a rise in the temperature of the pyrolysis gasification furnace 4 and the grindability that improves with a rise in the temperature of the pyrolysis gasification furnace 4 co-exist.

The woody biomass B is optimally heated in the pyrolysis gasification furnace 4, thereby manufacturing the torrefied material T in which a fiber portion (cellulose) included in the woody biomass B is thermally decomposed. Furthermore, a portion of three major components (cellulose, hemicellulose, and lignin) contained in the woody biomass B is vaporized into the pyrolysis gas P. A portion of the torrefied material T produced inside the inner tube 11 is fed from the inner tube 11 to the pulverizer 15 of the coal-fired power plant 7.

A portion of the remaining of the torrefied material T is fed along with the pyrolysis gas P that includes unburned combustibles from the inner tube 11 to the cyclone 6, separated from the pyrolysis gas P in this cyclone 6, and fed to the pulverizer 15.

The pulverizer 15 pulverizes the coal C fed from the coal bunker 14 and the torrefied material T fed from the pyrolysis gasification furnace 4 and the cyclone 6 while drying them. In other words, the torrefied material T has substantially the same physical properties as the coal C, making it possible to pulverize and co-combust the torrefied material T with the coal C in the pulverizer 15.

Herein, the current value of the pulverizer 15 when the pulverizer 15 is driven is sent to the control device 5. The control device 5 controls the temperature inside the inner tube 11 of the pyrolysis gasification furnace 4 so that the current value of the pulverizer 15 is in a generally constant range. That is, the control device 5 increases and decreases the temperature within the range of 250° C. to 350° C., making the current value of the pulverizer 15 constant.

Specifically, the control device 5 performs control such that, if the power consumption of the pulverizer 15 increases, the temperature of the pyrolysis gasification furnace 4 is increased to improve the grindability of the torrefied material T. With the improvement in grindability of the torrefied material T, the residual ratio of heat quantity in the torrefied material T decreases, and the pyrolysis gas P that increases in association thereto is introduced into the pulverized coal boiler 16 via the pyrolysis gas introduction passage 8 as described later.

The pulverized coal PC produced in the pulverizer 15 is fed to the pulverized coal boiler 16 and jetted inside the furnace along with transport air by a burner, resulting in combustion.

The pyrolysis gas P from which the torrefied material T was separated and removed by the cyclone 6 is jetted inside the furnace of the pyrolyzed coal boiler 16 via the pyrolysis gas introduction passage 8. That is, the pyrolysis gas P produced by the pyrolyzation of the woody biomass B is not utilized as a heating gas of the pyrolysis gasification furnace 4, but rather as an alternative fuel of the coal-fired power plant 7 along with the torrefied material T. The pulverized coal PC and the transport air are mixed with the pyrolysis gas P introduced from the cyclone 6 and combusted.

Then, steam produced by the heat produced when the pulverized coal PC was caused to combust in the pulverized coal boiler 16 is introduced into the steam turbine 17, and power is generated in the power generator 18 directly connected to the steam turbine 17.

According to the embodiment described above, the pyrolysis gas P is introduced into the pulverized coal boiler 16 along with the torrefied material T produced in the pyrolysis gasification furnace 4, thereby making it possible to utilize substantially all of the heat quantity of the woody biomass B supplied to the pyrolysis gasification furnace 4 in the pulverized coal boiler 16 of the coal-fired power plant 7 regardless of the residual ratio of heat quantity in the torrefied material T.

Furthermore, the stable property fuel F is used as an auxiliary fuel F of the combustion furnace 3, thereby making it possible to steadily ensure the heat quantity for pyrolyzing the woody biomass B in the pyrolysis gasification furnace 4. That is, the torrefied material T can be produced in the pyrolysis gasification furnace 4 in a stable manner.

Furthermore, an indirect heating type of pyrolysis gasification furnace 4 is adopted as the pyrolysis gasification furnace 4, thereby obtaining a gas with a high amount of heat generation without the hydrolysis gas P produced in the pyrolysis gasification furnace 4 being diluted by the combustion exhaust gas E, which is a heating gas. Furthermore, the amount of produced gas is also suppressed, making it possible to supply the pyrolysis gas P suitable for use as a fuel.

Furthermore, the pyrolysis gasification temperature is adjusted on the basis of the required power of the pulverizer 15 by the control device 5, making it possible to produce the torrefied material T superior in grindability. While the residual ratio of heat quantity of the torrefied material T decreases with the production of the torrefied material T superior in grindability, the increased pyrolysis gas P is supplied to the pulverized coal boiler 16, making it possible to make the amount of power generation derived from the woody biomass B substantially constant.

Furthermore, the torrefied material T superior in grindability can be produced, making it possible to improve the mixed fuel burning ratio with the coal C in the pulverized coal boiler 16.

Furthermore, since the torrefied material T superior in grindability can be manufactured, equipment such as a buffer tank that stores the torrefied material T when the load of the pulverizer 15 becomes excessive is no longer required.

Furthermore, the pyrolysis gasification furnace 4 and the coal-fired power plant 7 are adjacently disposed, and the pyrolysis gas introduction passage 8 is shortened, thereby making it possible to suppress the condensation of tar included in the pyrolysis gas P.

It should be noted that the technical scope of the present invention is not limited to the embodiments described above, and various modifications may be further made without deviating from the spirit of the present invention.

For example, while a co-pulverization method in which the coal C and the woody biomass B are mixed and pulverized is adopted in the above embodiment, the present invention is not limited thereto, allowing adoption of an independent pulverization method in which the coal C and the woody biomass B are independently pulverized.

The invention claimed is:

1. A biomass pyrolysis apparatus comprising:
   a combustion furnace that produces a heat quantity by causing a stable property fuel to combust;
   a pyrolysis gasification furnace that produces a torrefied material and a pyrolysis gas by pyrolyzing woody biomass by a heat quantity produced by the combustion furnace;
   a pyrolysis gas introduction passage that introduces the pyrolysis gas from the pyrolysis gasification furnace into a boiler, into which the torrefied material is introduced; and
   a control device that controls a temperature of the pyrolysis gasification furnace, wherein
   the control device controls a temperature of the pyrolysis gasification furnace so that the current value of a pulverizer that pulverizes a torrefied material produced by the pyrolysis gasification furnace is generally in a constant range, and
   the control device performs control such that the temperature of the pyrolysis gasification furnace is increased when the power consumption of the pulverizer increases.

2. The biomass pyrolysis apparatus according to claim 1, wherein the pyrolysis gasification furnace is an indirect heating type pyrolysis gasification furnace that indirectly heats the woody biomass by a heating gas.

3. A power generation system comprising: the biomass pyrolysis apparatus according to claim 1;
   a boiler in which the torrefied material is introduced and by which the torrefied material is combusted;
   a steam turbine in which steam produced by the boiler is introduced; and
   a power generator driven by the steam turbine.

\* \* \* \* \*